Figure 20:
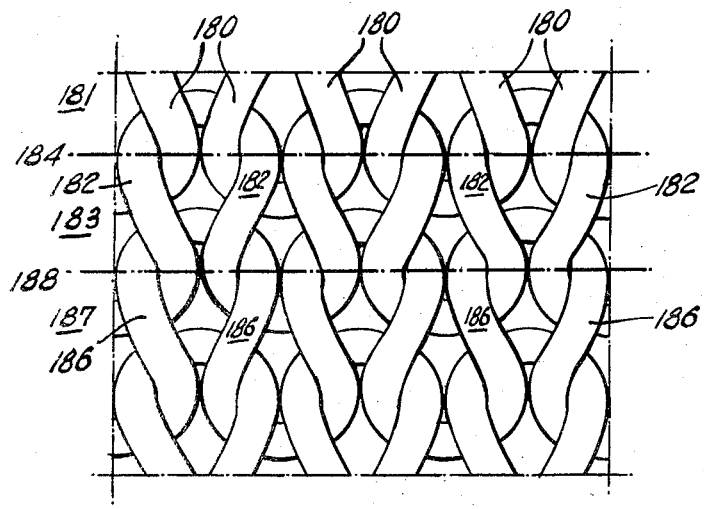

July 20, 1965
N. WEHRMANN
3,195,212
FORM FOR CONDUCTING TUBULAR FABRIC
Filed Nov. 2, 1960
10 Sheets-Sheet 1
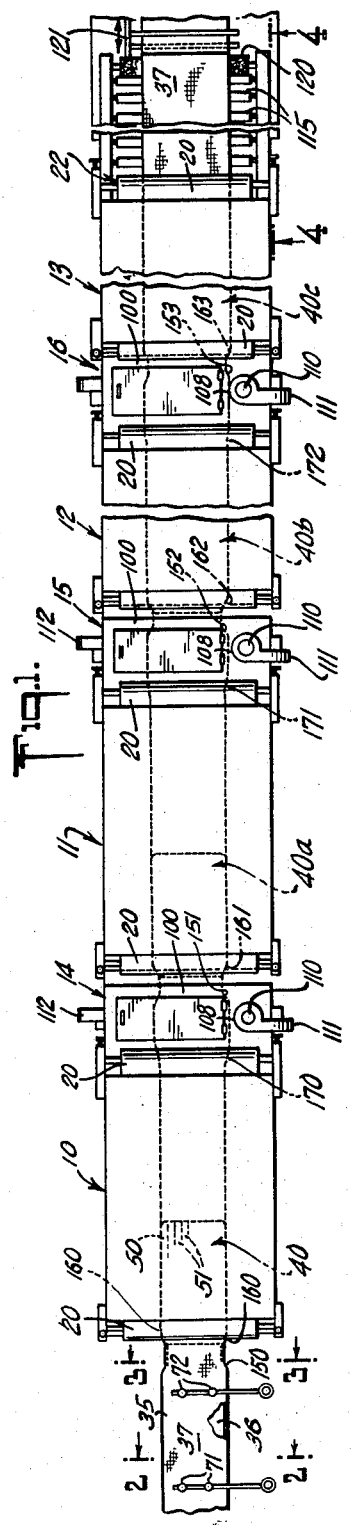
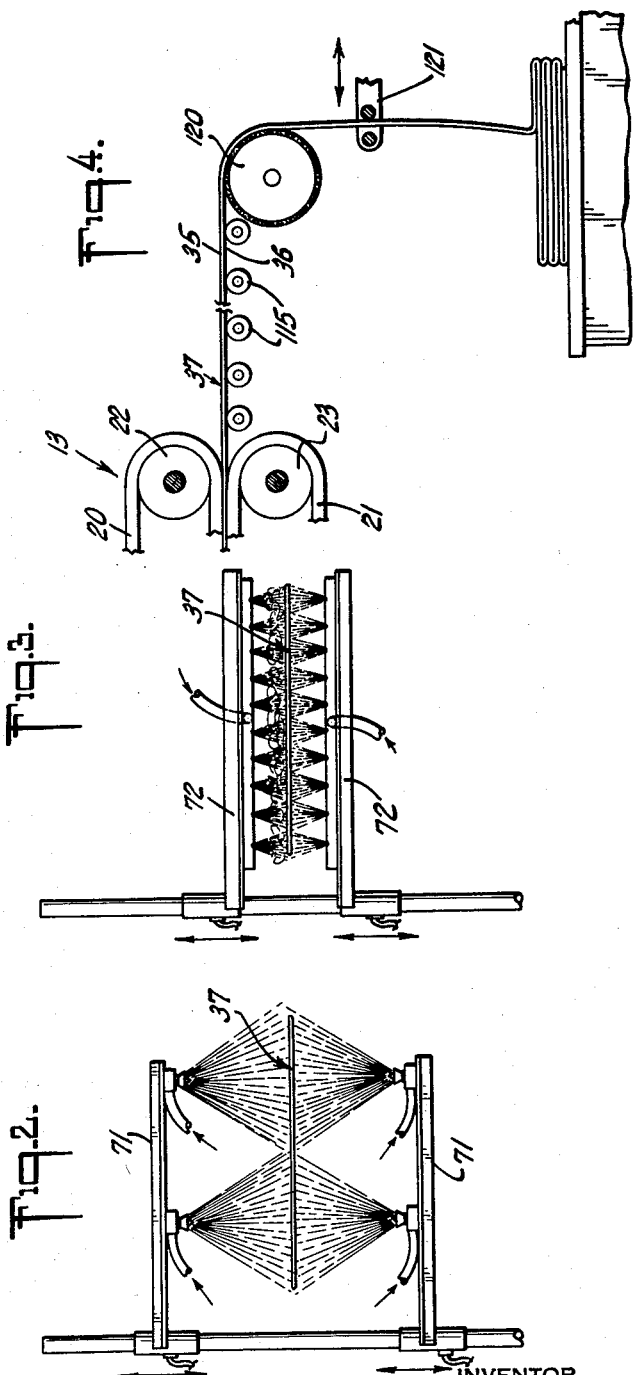
INVENTOR
NICHOLAS WEHRMANN
BY
Morrison, Kennedy & Campbell
ATTORNEYS:

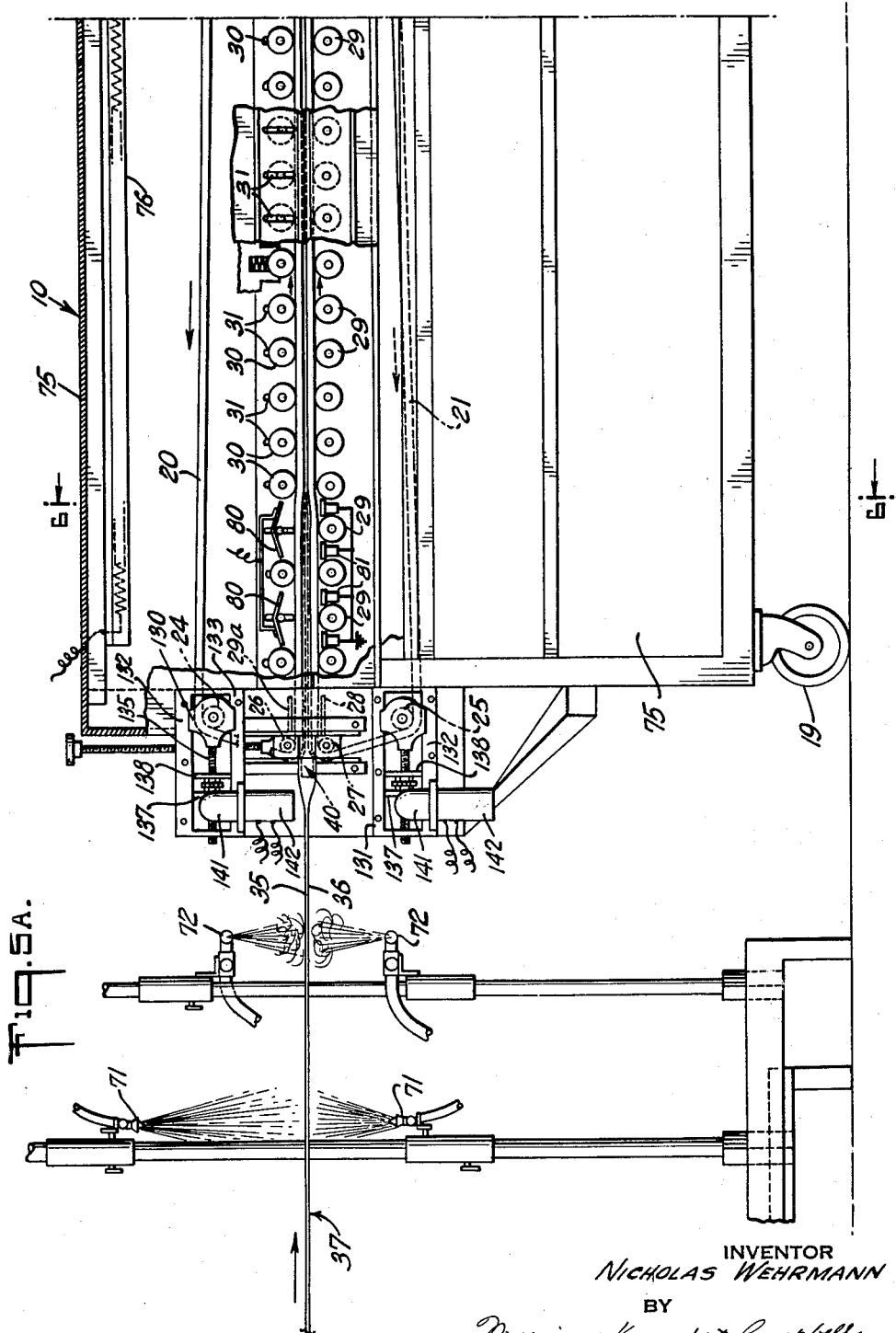

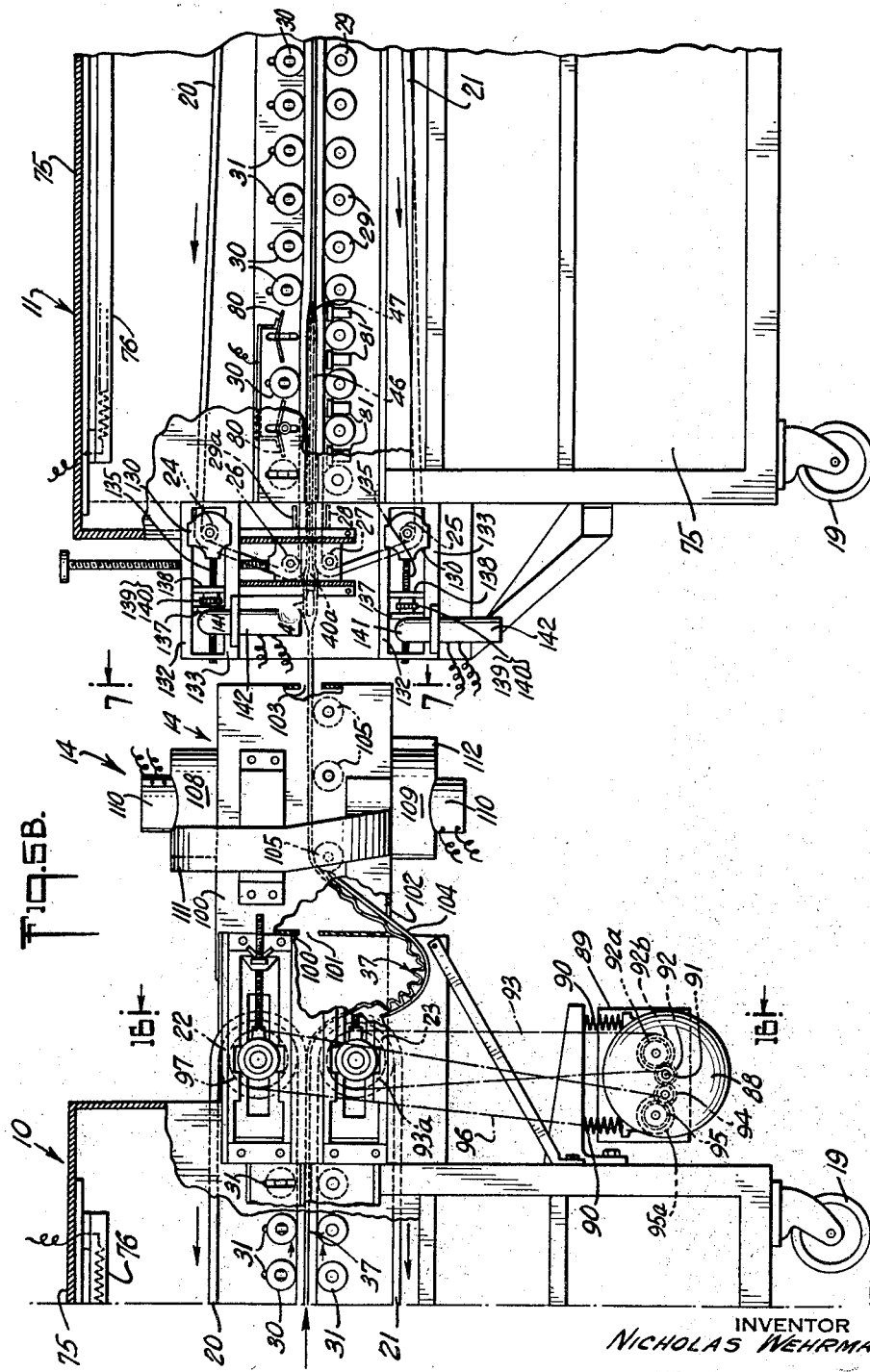

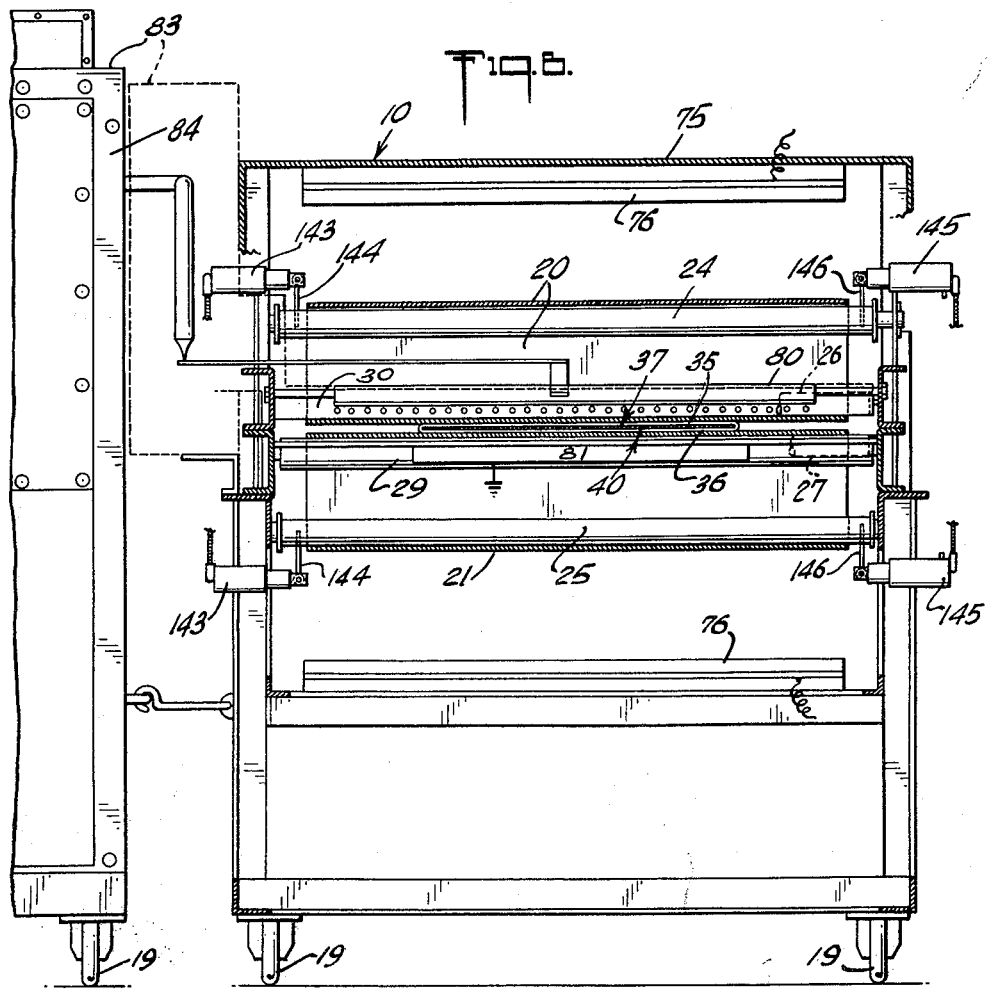
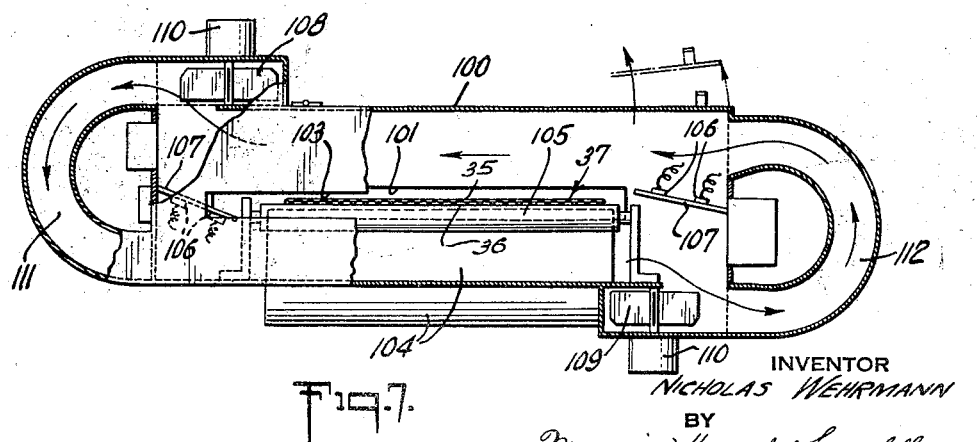

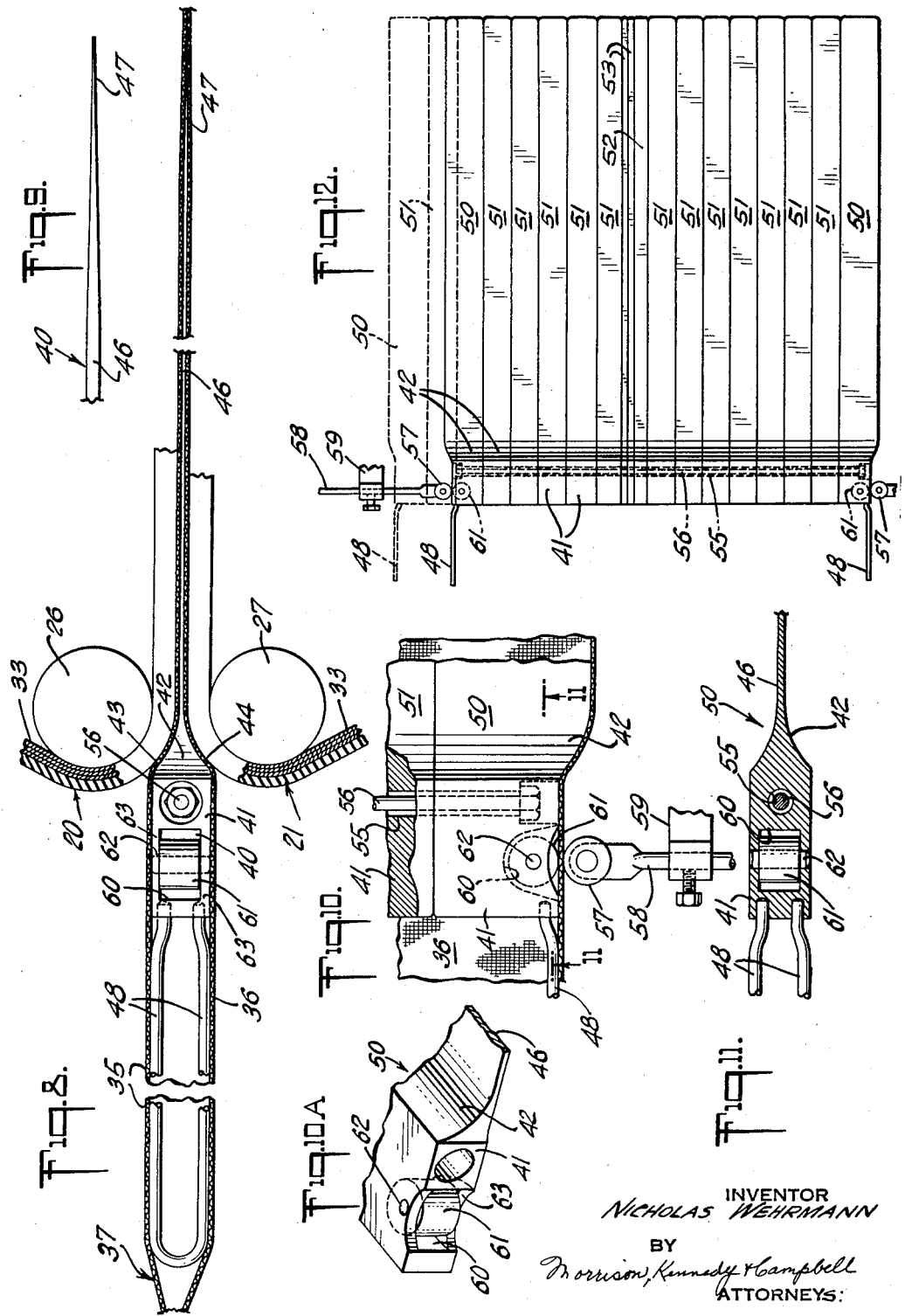

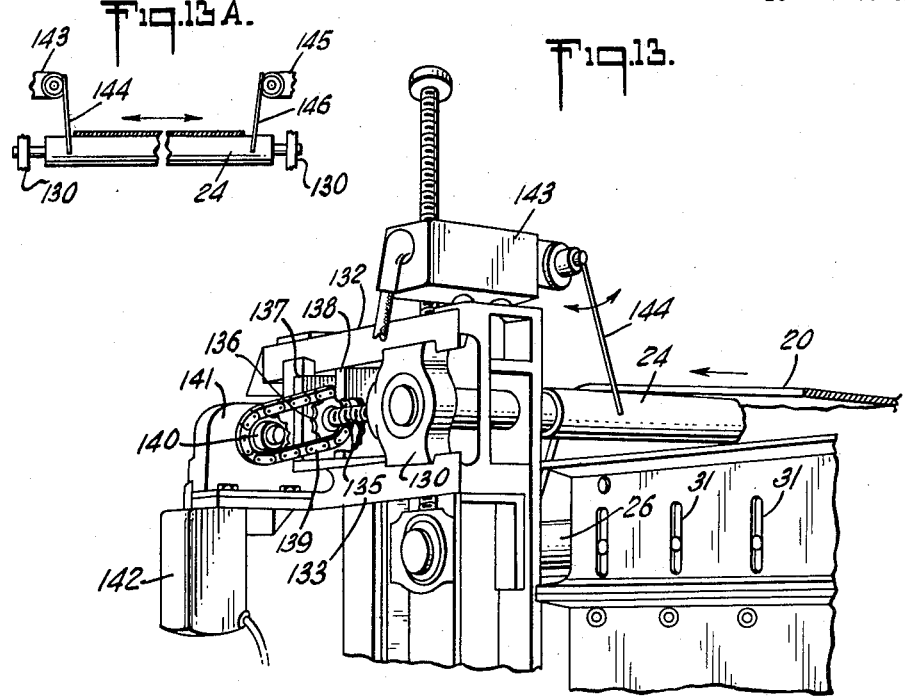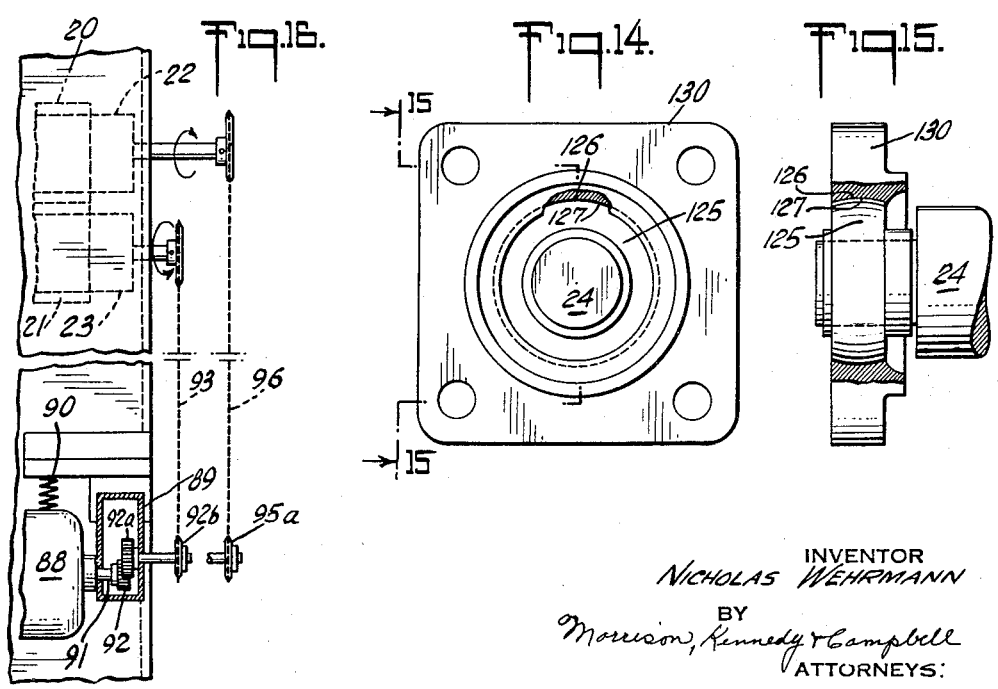

July 20, 1965 N. WEHRMANN 3,195,212
FORM FOR CONDUCTING TUBULAR FABRIC
Filed Nov. 2, 1960 10 Sheets-Sheet 7
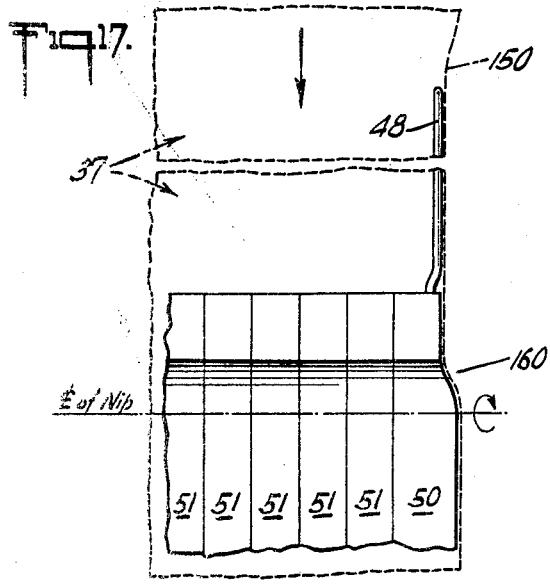
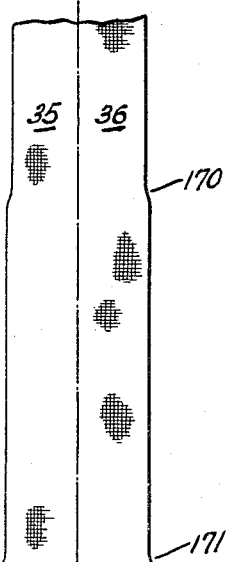
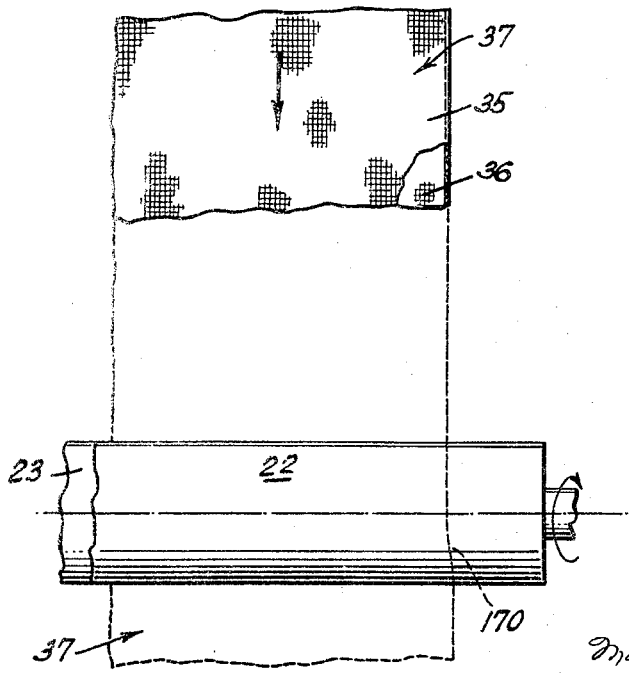
INVENTOR
NICHOLAS WEHRMANN
BY
Morrison, Kennedy & Campbell
ATTORNEYS:

July 20, 1965 N. WEHRMANN 3,195,212
FORM FOR CONDUCTING TUBULAR FABRIC
Filed Nov. 2, 1960 10 Sheets-Sheet 8

INVENTOR
NICHOLAS WEHRMANN
BY
Morrison, Kennedy & Campbell
ATTORNEYS

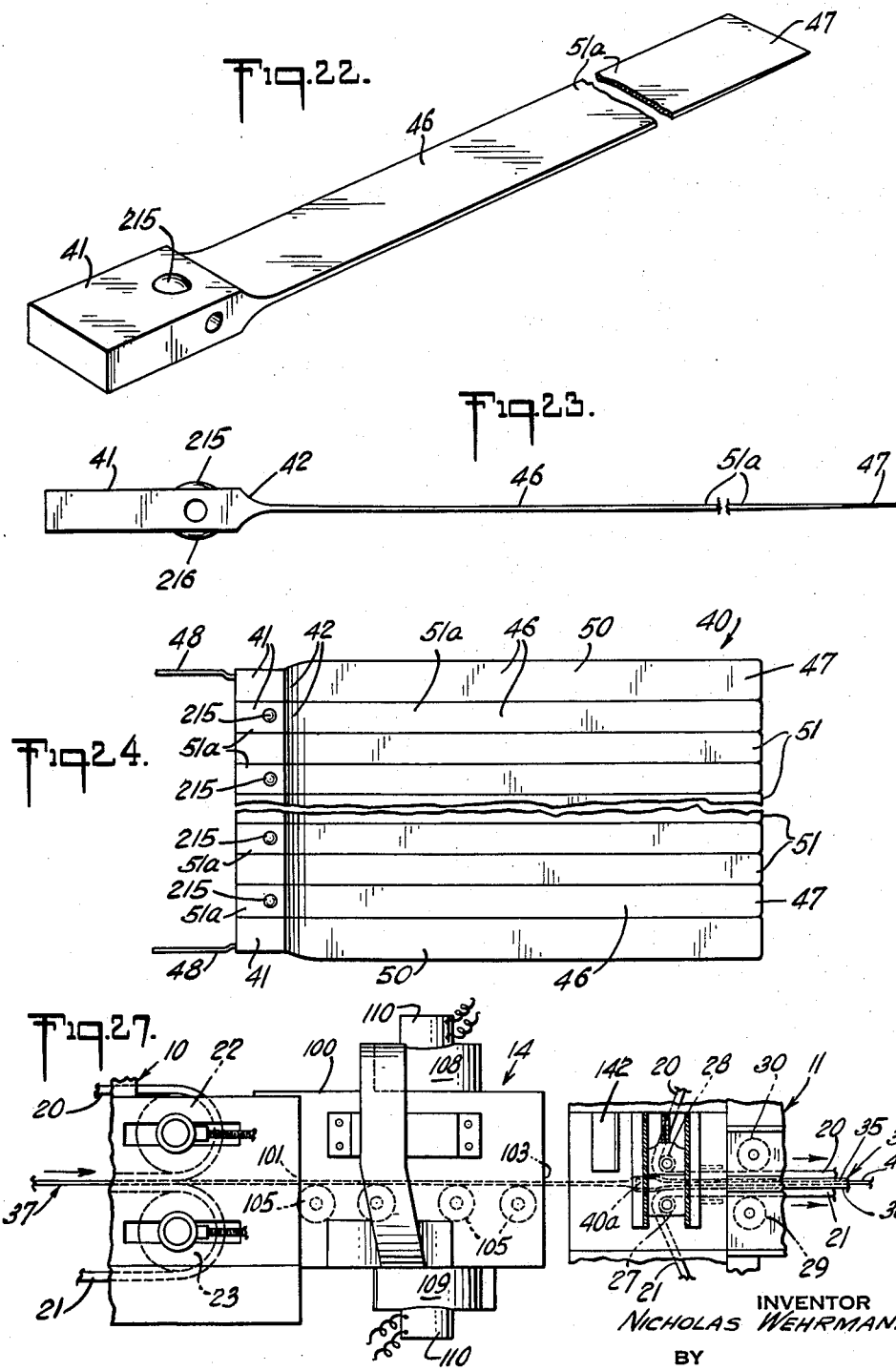

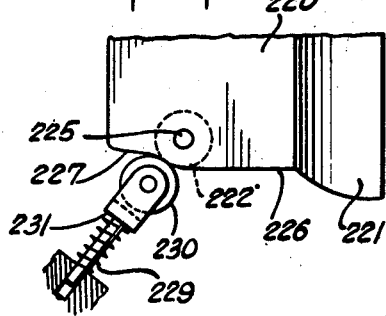
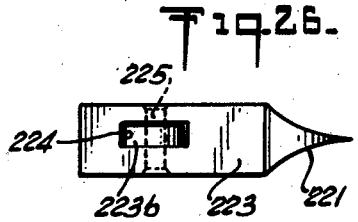
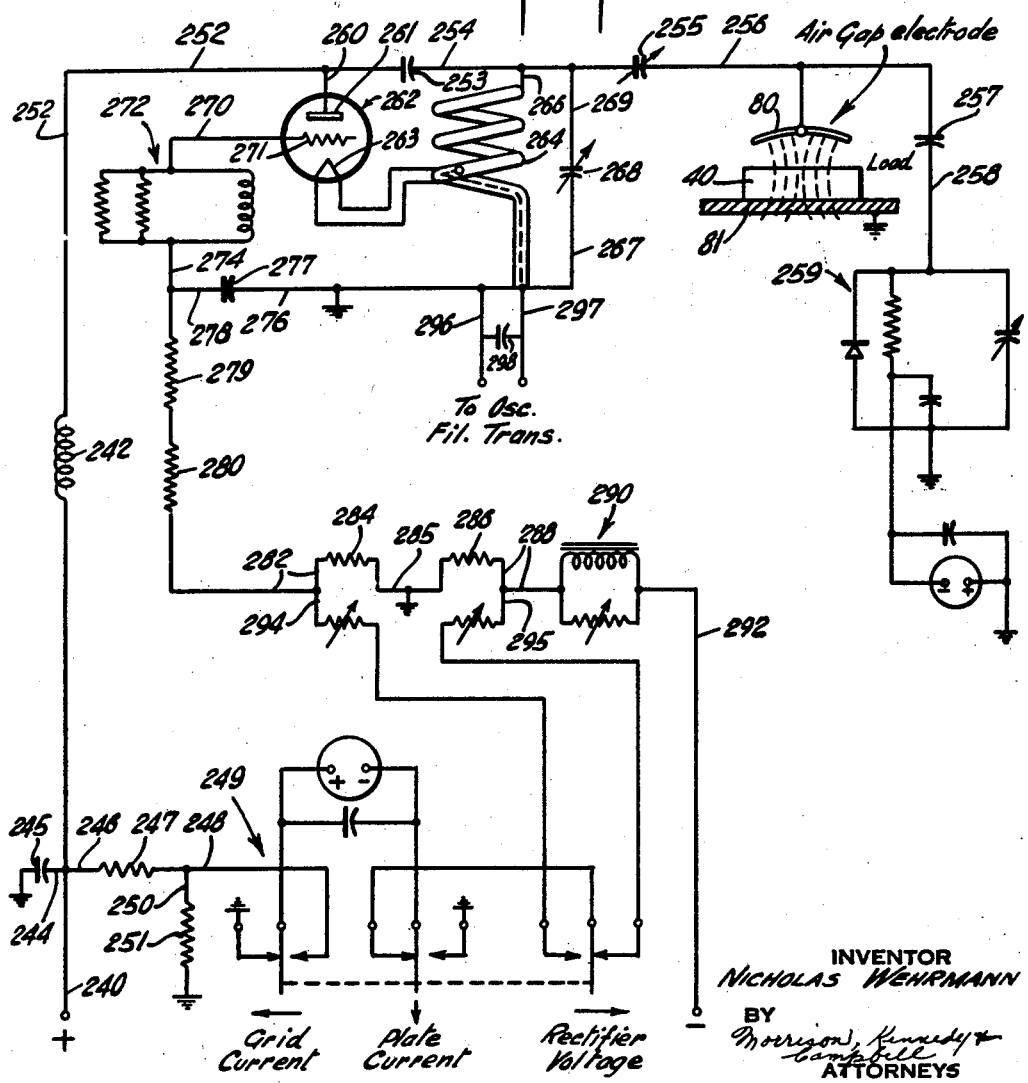

United States Patent Office 3,195,212
Patented July 20, 1965

3,195,212
FORM FOR CONDUCTING TUBULAR FABRIC
Nicholas Wehrmann, North Wilkesboro, N.C., assignor to L & L Manufacturing, Inc., a corporation of Delaware
Original application Nov. 2, 1960, Ser. No. 66,816. Divided and this application June 29, 1964, Ser. No. 378,682
7 Claims. (Cl. 26—18.6)

This application is a division of my copending application Serial No. 66,816, filed November 2, 1960, and relates to forms for conducting tubular fabric thereover in a forward direction and especially for conducting thereover tubular fabric in a shape having spaced sides toward, and engaging the sides thereof with, means having converging portions between which the fabric is to be moved forwardly, as, for example, belts between and by which the fabric is to be moved forwardly.

In my Patent 3,007,223 there is disclosed a unitary form for pressing the fabric against the turns of the belts. It has been found that variations normally occurring the thickness of endless belts (and even, in some cases, in the fabric) thruout their lateral extent at various points along their length tend to cause variations in the gripping of the fabric between the unitary form and the turns of the belts, which causes slight but sometimes undesirable variations in the fabric movement thruout the lateral extent of the fabric. To avoid this, the present invention, in certain of its aspects, contemplates the provision of a form comprising a plurality of independent sections which are laterally aligned but which are capable of relative but limited longitudinal (and preferably also transverse) movement. The provision of this type of form has the additional advantage of permitting forms of varying width to be readily provided at successive stages in the operation.

The invention accordingly comprises apparatus embodying features of construction, combinations of elements and arrangement of parts which are adapted to effect such steps, as exemplified in the following detailed disclosure, and the scope of the application of which will be indicated in the claims.

Figure 21:
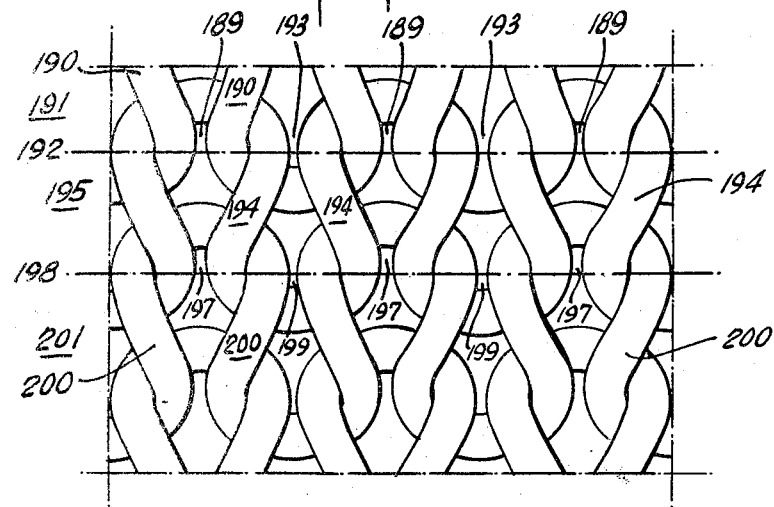

For a fuller understanding of the nature and objects of the invention, reference should be had to the following detailed description taken in connection with the accompanying drawings, in which:

FIGURE 1 is a diagrammatic plan view of one form of device embodying the invention;
FIG. 2 is a fragmentary view on an enlarged scale along the line 2—2 of FIG. 1;
FIG. 3 is a similar view along the line 3—3 of FIG. 1;
FIG. 4 is a sectional view on an enlarged scale along the line 4—4 of FIG. 1;
FIGS. 5A and 5B constitute a side elevation, partly in section, showing portions of the machine in detail;
FIG. 6 is a transverse sectional view along the line 6—6 of FIG. 5A;
FIG. 7 is a sectional view along the line 7—7 of FIG. 5B, partly broken away;
FIG. 8 is a partly sectional detail side view of the belts, the form, and the fabric;
FIG. 9 is a further enlarged view of the forward portions of the form;
FIG. 10 is a fragmentary plan view of portions of the form on the same scale as FIG. 8;
FIG. 10A is a perspective view further illustrating the structure shown in FIG. 10;
FIG. 11 is a section on the line 11—11 of FIG. 10;
FIG. 12 is a plan view on a smaller scale of a portion of the form;
FIG. 13 is a perspective view showing the belt-aligning mechanism;
FIG. 13A is a schematic sectional view showing the belt-aligning mechanism;
FIG. 14 is an end view of a bearing;
FIG. 15 is a section on the line 15—15 of FIG. 14;
FIG. 16 is a diagrammatic view of the driving mechanism;
FIG. 17 is a schematic plan view exemplifying variations in the lateral extent of a fabric as it passes onto the form and between the belts;
FIG. 18 is a similar view on a smaller scale exemplifying in exaggerated form variations in the peripheral lateral extent thereof;
FIG. 19 is a fragmentary view showing on the scale of FIG. 17 the expansion of the fabric as it comes from the first unit of the machine;
FIG. 20 is an enlarged plan view of a portion of a fabric wherein tendencies toward lateral shrinkage have been minimized in accordance with the invention;
FIG. 21 is a similar view of an untreated fabric which is free to shrink laterally;
FIG. 22 is a perspective view of a modified interior form section;
FIG. 23 is a side view thereof;
FIG. 24 is a diagrammatic type view of a form embodying sections of the type shown in FIG. 22;
FIG. 25 is a fragmentary top view of a modified type of form;
FIG. 26 is a side view thereof;
FIG. 27 is a view corresponding to the central portion of FIG. 5B illustrating a modification; and
FIG. 28 is a showing of the air-gap dielectric circuit.

The exemplified apparatus comprises a plurality of successive units 10, 11, 12, and 13 whereby tubular fabric is longitudinally compacted and whereby it may be laterally compacted, and a plurality of intermediate units 14, 15, and 16 whereat the fabric may be partially or fully dried and/or permitted to expand laterally. The fabric may be heated and/or dried in desired ones of the units 10–16, each of the units 10 thru 13 being, in the present instance, adapted to effectuate a heating of the fabric whereby moisture will escape therefrom as opportunities therefor are provided, and each of the units 14 thru 16, which as exemplified are mounted on the units 10–12 respectively, being, in the present instance, adapted to effect a positive hot-air drying of the fabric. The units 10–13 shown are individually mounted on casters 19 as exemplified. It will be appreciated that, while the units 10–13 shown are four in number, two, three, five or any greater number of units may be used without departing from the invention in certain of its broader aspects.

Each of the units 10–13 comprises, as particularly illustrated in connection with the unit 10 in FIGS. 5A and 5B, a pair of endless belts 20 and 21 which, respectively, pass between and are driven by forward rollers 22 and 23, and which pass over idler rollers 24 and 25 and over and between rearward rollers 26 and 27. Suitable means for adjusting the various rollers may be provided as indicated in the drawings. The belt 21, as it comes from between the rollers 26–27, is first guided by a fixed plate 28, and then, as it runs toward the rolls 22–23, is supported by a series of fixed-axis rolls 29; and the belt 20, as it comes from between the rollers 26–27, is first guided by a fixed plate 29a, and then, as it runs toward the rolls 22–23, runs under downwardly spring-pressed or weighted rolls 30 which are slidably mounted in vertical slots 31 and which serve to press the belt 20 toward the belt 21, and thus urge the belts 20 and 21 together.

The belts (see FIG. 8) which may be one-quarter inch in transverse extent, are formed of stretchable materials, such as rubber, having a firm outer surface, and are desirably reinforced at their inner halves by layers of duck fabric 33. Since the interior surface of a belt moves at the same speed over the rollers as it does along its straight-run portions, its outer surface, which describes a larger arc over the rollers than the inner surface, will tend to move faster than the inner surface as it passes over a roller, such as the roller 26, and, since the outer surface of the belt is stretchable, it will actually move faster than the inner surface, and accordingly faster than the outer surface moves in the straight-run portions of the belts, since both the outer surface and the inner surface of the belt move at the same speed at the straight-run portions as the inner surface does in passing over the rollers. Consequently, by pressing the flattened upper and lower sides 35 and 36 of a tubular knitted fabric 37 against the outer surfaces of the belts 20 and 21 as they pass over their respective rollers 26 and 27, there will be imparted thereto a speed which will be greater than the speed of the fabric as it subsequently moves forwardly while lying between the straight-run portions of the belts, with the result that the fabric is longitudinally compacted as it moves between the straight-run portions of the belts. As exemplified, the sides 35 and 36 of the fabric 37 are guided to and pressed against the outer surfaces of the turns of the belts in unit 10 as the belts pass over the rollers 26 and 27 by means of a form 40, which, in the present instance, comprises a relatively thick (one-half inch) portion 41 which receives the fabric 37 in a shape having flattened sides, and a sharply tapered decreasing-extent portion 42 which presses the fabric against the outer surfaces of the belts along lateral lines 43 and 44, and a thin (one thirty-second of an inch) portion 46 lying between forward parts of the straight-run portions of the belts, and a gradually tapered end 47. In order to further assist in guiding the fabric toward the belts, a pair of guiding arms 48 extend rearwardly from the form 40. As will be apparent from a comparison of FIGS. 8 and 10, the peripheral extent of the form 40 is, in this instance, substantially unvarying throughout its length. The tubular fabric will not be stretched laterally while on the form.

Pursuant to the present invention in certain of its aspects, the form 40 is composed of a plurality of separate elements which are capable of a limited relative longitudinal (and, in the present instance, transverse) movement. These comprise (FIG. 12) side elements 50 and intermediate elements 51. By providing also intermediate elements 52 and 53 which are of less width than the elements 51 and which may be substituted for the elements 51, a form of any desired width may be provided depending on the width (peripheral extent) of the fabric which it is desired to longitudinally compact in any particular one of the units 10–13. There may thus be provided a multisectional form (as shown in FIG. 12) certain sections of which (e.g. the forwardly diverging outer sections 50 and/or the intermediate sections 51) are of a greater width than other of the sections (e.g. the sections 52 and 53). As will be seen, the units 11, 12, and 13, respectively, are provided with forms 40a, 40b, and 40c, each of which, in the present instance, differs from the form 40 and from preceding forms only in width, i.e., by containing additional elements 51, 52, or 53, as needed. An additional advantage of providing a form composed of a plurality of elements is that such elements can be so mounted as to have enough longitudinal play to permit each element to continuously adjust itself to variations in the contour of the particular portions of the belts (or the fabric) with which it comes in contact. In order to so mount these elements, each element is formed with a laterally-extending bore 55 (or an opening of other shape). These openings are aligned, and there extends thru these openings a rod 56 of less extent longitudinally of the elements than the openings (in the present instance of less diameter than the bores) to permit longitudinal play of the individual elements. Since the rod 56 is of less diameter than the bore 55, the arrangement, while restricting lateral movement (i.e. widthwise of a fabric moving over the form) will not only permit relative movement of the sections in a forward-and-rearward direction (right-and-left in FIG. 12) but also transversely (perpendicular to both the length and width of FIG. 12).

Each form is held centered, in the present instance, by a roller 57 bearing loosely against the fabric on each edge of the portion 50 of the form and rotatably mounted on an arm 58 adjustably held in a frame piece 59. In order to further facilitate the movement of the fabric, the edges of the form, pursuant to the present invention in one of its more specific aspects, is provided with recessed rollers which may cooperate with rollers such as 57 or with other centering means. In the exemplified construction, the outer or edge elements 50 of the form are formed, between their side surfaces and extending inwardly from their edges, with recesses 60 in which are disposed wheels or rolls 61 mounted on axes 62 transverse of the elements 50 and with their circumferences extending outwardly to the position of the respective edges of the elements 50 which are forward and rearward of the wheels 61. The edges of the elements 50 are laterally recessed at 63 so that the edges of the fabric passing between the wheels 61 and 57 will be contacted thereby. In this manner, binding of the fabric by the wheels 57 is avoided.

Prior to entering unit 10, the fabric may be suitably treated, as by drawing it between water spray means 71 and jets 72 of high-pressure (25 pounds per square inch) steam. Desirably a water content which adds 30% to the weight of the dry fabric should be imparted.

Each of the units 10–13 is enclosed in a casing 75 having openings in its front and rear ends and provided with electric heating means 76 by which the interior of the casing is heated to a temperature of 275° F., for example. Heat is transferred to the belts and thence to the fabric. In order to further heat the fabric within certain of the units, as for example the units 10 and 11, there is provided high frequency airgap di-electric heating means, one form of which is illustrated diagrammatically in FIGS. 5A, 5B, and 6, and which, as exemplified, is adapted to selectively heat all or part of the portion 46 of the form, which is, or elements of which are, in the present instance, formed of stainless steel. This air-gap di-electric heating apparatus comprises suitable highly-directional electrode means 80 above the portion 46 of the form and electrode means 81 below the portion 46 of the form, and grounded to casing 75, as illustrated diagrammatically in FIGS. 5A, 5B, and 6. A potential of 4 kv. at 13.5 mc. is applied to the electrode means 80, and an RF field is produced between the electrode means 80 and the grounded electrode means 81. The apparatus is designed so that the greatest concentration of molecular disturbance is generated in a steel form such as the form 40. This produces a temperature rise at this point. The plates are suitably energized, as by generating and oscillating means in apparatus designated generally at 83 and including a metallic casing 84 connected to casing 75. By this means the fabric is indirectly heated to an extent which will increase the temperature of the fabric without melting or otherwise harming the same. In the form of construction exemplified, the fabric is indirectly heated when between the belts by the heat which the belts acquire as they run thru their respective ovens, and, in certain of the units, is also indirectly heated by the heat induced in the form by the air-gap di-electric means.

Desirably the moisture-containing fabric comes from between the belts at a temperature sufficient to give off steam.

Each set of rollers 22–23 is driven from a variable-speed motor 88. The speed of each motor 88 is individually controlled by conventional manually-operated speed control means (not shown). In the present instance, the motor carries a gear box 89. The motor 88 is suspended from the frame of the machine by springs 90 so as to be movable downwardly by gravity. The gear box 89 is rockable on the motor shaft 91. A gear 92 on the motor shaft meshes with a gear 92a integral with a pulley 92b over which runs a drive belt 93 extending over a pulley 93a on drive roller 23. Thru the medium of a gear 94, the gear 92 rotates a gear 95 integral with a pulley 95a over which runs a drive belt 96 extending over a pulley 97 on drive roll 22. In this manner, some of the weight is taken off the drive belts 93 and 96, while, at the same time, the speed of these belts is equalized. The total friction on the drive belts 93 and 96 is less than the total friction on belts 20 and 21, so that the longitudinal speed of the straight-run portion of the belt 20 will, at all times, be the same as the longitudinal speed of the straight-run portion of belt 21, since any tendency toward deviation will be taken up by belts 93 and 96 whose speeds will be mutually adjusted by the rocking action of the gear box.

Each of the units 14, 15, and 16 comprises a casing 100 provided with rearward slots 101 and 102 and a forward opening 103 thru which the fabric passes into and out of the casing, a lateral trough 104 which extends thru the opening 102 and in which excess fabric may gather, and a series of rolls 105 over which the fabric is thereupon adapted to pass. Inside the casing, electrical heating elements 106 are mounted on shields 107 in such position that radiant heat therefrom will not be directed on the fabric. Air, heated, for example, to a temperature of 300° F. to 450° F., is circulated in the direction of the arrows (FIG. 7) by blowers 108 and 109 which are driven by motors 110, and from the respective sides of which air is conducted thru off-center conduits 111 and 112, so that the hot air flows above the fabric in one lateral direction and below the fabric in the other lateral direction. The flow of air laterally of the fabric advantageously fluffs the yarns.

As it moves to and thru the units 14, 15, and 16, the fabric, which has been longitudinally compacted in a preceding one of the units 10, 11, or 12, is permitted to expand laterally, which it will do of its own accord, when it is free to do so, after having been longitudinally compacted, because of the crowding of the loops during longitudinal compaction. The speed of the belts in each of the units 11, 12, and 13 is so controlled that each successive pair of belts will move more slowly than the belts of a preceding pair. The speed of each successive pair of belts should be such that the fabric, which has been longitudinally compacted by a preceding pair of belts, but which, after it has left said pair of belts, has longitudinally expanded naturally to a considerable but lesser extent, will move onto the forms 40a, 40b, and 40c, respectively, at a substantially slower speed than that at which it moved onto forms 40, 40a, and 40b. If desired, the speed may be slightly increased so as to assure against any build-up of the fabric in the units 14, 15, or 16, or may be slightly decreased (as exemplified in FIG. 5B) to facilitate build-up of the fabric. However, the fabric is subjected to no lateral stretching action, all lateral expansion being such as occurs naturally in the fabric.

As the fabric comes from between the belts of unit 13, it passes along idler rolls 115 and over a speed-controlled driven roll 120 to be folded by a folder 121. The roll 120 is desirably formed with a surface of sandpaper or with an otherwise roughened fabric-engaging surface. The speed of the roll 120 may be so adjusted as to leave the fabric free to expand laterally naturally or may be so adjusted as to put the fabric under slight longitudinal tension to contract it laterally to a slight extent, but not to move it as fast as the speed imparted to it by the turns of the belts of unit 13.

In order to maintain the belts centered on the rollers, each of the rollers 24 and 25 is provided at both ends with end portions 125 with rounded bearing surfaces 126 moving in similarly-rounded bearing surfaces 127 to provide a self-aligning bearing. At one end of each roller, the bearing surface 127 is formed in a bearing block 130 which is mounted for longitudinal sliding movement on tracks 132 and 133. Each block carries a rearwardly-extended threaded shaft 135 on which is screwed a sprocket 136 which has a threaded bore and which is held between plates 137 and 138 against longitudinal movement. A laterally-extending sprocket-chain 139 connects each sprocket 136 with a sprocket 140 driven by reduction gearing in a casing 141 from a reversible electric motor in a casing 142. Each such motor is energized for movement in one direction by a micro-switch in casing 143 in response to movement of a trip finger 144 by the belt if it shifts too far to the left (FIGS. 13 and 13A) and in the reverse direction by a micro-switch in casing 145 in response to movement of a trip finger 146 by the belt if it shifts too far to the right (FIGS. 13 and 13A). So long as the belt is properly centered, neither micro-switch will be actuated, and no movement of the block 130 on its tracks will occur; but, when necessary, the block can be slid to slant the roller 24 (or 25) one way or the other enough to center the belt thereon.

In FIGS. 17 and 19 (and in FIGS. 1 and 18 in exaggerated form) there are shown the width changes in a typical fabric as it passes thru the machine. In FIGS. 1, 17, and 19 the actual top width of one of the flat sides of the fabric is indicated, the decreases in width at points 150, 151, 152, and 153 being due merely to the fact that the fabric runs onto the thickened portions of the forms, and the increases in width at points 160, 161, 162, and 163 being due merely to the thinning of the forms, so that both are only apparent and not real. At points 170, 171, and 172, however, the fabric actually expands laterally, tho in a completely natural manner, the expansion at these points being shown not only in FIG. 19 but also in FIG. 18 where the fabric is illustrated as if it had been split longitudinally and spread out flat. For example, a tubular fabric which was formed of 26's single cotton yarn jersey knit twenty-two needles to an inch, thirty-four courses per inch when knitted, and which is seventeen and three-fourth inches in width (thirty-five and one-half inches in peripheral extent) as it enters the machine may be given a moisture content of 22% of the dry weight of the fabric. The fabric will be moving at a speed of thirty feet per minute as it comes from the belts of unit 10 and will expand laterally naturally to eighteen inches (thirty-six inches peripherally), will be moving at twenty-eight feet per minute as it comes from the belts of unit 11 and will expand laterally naturally to eighteen and one-fourth inches (thirty-six and one-half inches peripherally), will be moving at twenty-six feet per minute as it comes from the belts of unit 12 and will expand laterally naturally to eighteen and one-half inches (thirty-seven inches peripherally), and will be moving at twenty-four feet per minute as it comes from the belts of unit 13. At this stage, the fabric may be permitted to expand laterally naturally, but I have found it advantageous, in certain instances, to move it at a speed of twenty-six feet per minute, as by a tensioning roll as hereinafter described, in which case it will assume a final width of eighteen and one-half inches.

In the example just given, the speed of the straight-run portions of the belts in units 10, 11, 12, and 13 will, of course, be thirty, twenty-eight, twenty-six, and twenty-four feet per minute, respectively. The speed at the turns of the belts may be obtained, for the conditions set forth above, by multiplying the speed of the straight-run portions by 1.2 (one and one-fifth).

A longitudinal compaction of the fabric tends to bow the loops of the knitted yarn thus providing a fabric with an increased longitudinal resiliency. The bowing of the loops, moreover, provides a longitudinal stretch characteristic which is operative without significant pulling together of the fabric laterally (i.e. from edge to edge thereof).

Repeated setting of the fabric in the belts tends to fix the bowed characteristic of the loops.

By means of the exemplified process and apparatus, fabrics having a 16% increase in longitudinal compaction and a 12% increase in longitudinal resiliency can be obtained. By increasing initial moisture content to 30% and adding two additional units with similarly widened forms and similarly slower belt speeds and with preceding drying units, the 16% and 12% figures may be increased to 20% and 14%, respectively.

In order to minimize lateral shrinkage of a jersey knitted tubular fabric, for example, the number of wales around the fabric multiplied by four times the width of the yarn should substantially equal the circumference of the fabric. There is hereinafter exemplified a process and apparatus whereby such a result can be effectively obtained by the time the fabric comes from the forward unit (the unit 13 in the present instance, tho it will be understood that it may be the third unit for some fabrics or a fifth, sixth, etc., unit for others) the fabric should have been laterally compacted (compacted in the direction of the width of the flattened fabric) so greatly that this lateral (widthwise) compaction (taken together with the longitudinal and transverse compaction as above exemplified) will provide a fabric such as shown in FIG. 20. The legs 180 of the loops in one row 181 and the legs 182 of the loops of an adjacent row 183 will fill substantially all the space on a line (shown in dot-and-dash at 184) extending laterally of the fabric, that the legs 182 of the loops of row 183 and legs 186 of the loops of row 187 will fill substantially all the space on a line (shown in dot-and-dash at 188) extending laterally of the fabric, etc. By contrast, there is shown in FIG. 21 a fabric wherein there are spaces 189 between the legs 190 of the loops in a row 191 on the dot-and-dash line 192, and spaces 193 between the legs 194 of the loops of row 195 on the dot-and-dash line 192, spaces 197 between the legs 194 of the loops of row 195 on the dot-and-dash line 198, and spaces 199 between the legs 200 of the loops of row 201 on the dot-and-dash line 198, etc.

In addition, it will be noted that, due to the longitudinal compaction, the legs of the loops are bowed enough to reduce the size of other spaces in the fabric, and that the transverse compaction also assists in obtaining this result.

A result such as indicated in FIG. 20, or to a compensation in whole or in part for undue lateral expansion between units, may be achieved by causing a lateral gathering of at least the central portions of the sides of the fabric, but without the formation of pleats or ripples. For example, a central part of a rearward portion of a form (corresponding to a portion 41), may, in the form of a unit such as a unit 11, a unit 12, and/or a unit 13, be centrally thickened sufficiently to more than compensate (or to wholly or partly compensate) for the natural lateral expansion of the fabric after it has been longitudinally compacted. The central portions of the sides of the fabric will then run off the thickened part of the form with a slightly greater number of walls to the inch centrally of the sides than at or at and near the edges of the fabric, which lateral compaction will tend to spread itself into the edge portions of the fabric as the fabric approaches the turns of the belts and to be preserved when the fabric is pressed against the turns of the belts and to be set into the fabric when the fabric is between the belts. In FIGS. 22, 23, and 24 there is exemplified one type of thickening means for the central portions of the rear ends of a form, by which a lateral compaction of the fabric may be thus accomplished. In this embodiment, certain of the interior sections of a form such as illustrated in FIG. 12 may be thickened somewhat by the provision of protuberances thereon. As shown in FIGS. 22 and 23, an interior section 51a has slight humps 215 and 216 formed on both of its side surfaces, and such sections may be spaced among the other interior sections 51, as desired, as exemplified in FIG. 24. It will be appreciated that, altho the exemplified means effects a greater spacing of the central portions of a fabric rearwardly of the place where gathering occurs, the invention in its broader aspects contemplates effecting a difference in spacing, however effected, of the central parts of the sides of the fabric from the parts of the sides near the edge portions thereof followed by permitting the spacing of the central parts to approach the spacing of the parts near the edge portions as the fabric moves forwardly. By such an arrangement, the lateral extent of the fabric may be controlled so that the widening tendencies thruout the machine are reduced, and may even be so controlled that it has the same or a lesser (depending on the size, character, and location of the humps) lateral extent when it leaves the belts of the final unit as it had when it went between the belts of the first unit. When such lateral gathering is designed to fully compensate for the natural lateral expansion of the fabric as it comes from the belts of a preceding unit, the portions of the form forwardly of the centrally-thickened part may have the same width and conformation as those of the form of the preceding unit.

For example, a fabric which was formed of 26's single cotton yarn jersey knit twenty-two needles to an inch, thirty-four courses per inch when knitted and which is seventeen and three-fourths inches in width (thirty-five and one-half inches in peripheral extent) as it enters the machine, may be moving at a speed of thirty feet per minute as it comes from the belts of unit 10, and will expand laterally namely to eighteen inches (thirty-six inches peripherally), the fabric guiding means will position the fabric between the straight runs of the belts of unit 11 at a width of seventeen and three-fourths inches where they are moving at a speed of twenty-eight feet per minute, the fabric will again expand laterally to eighteen inches and fabric guiding means at unit 12 will position the fabric between the straight runs of the belts of unit 12 at seventeen and three-fourths inches in width where the speed of the straight runs at unit 12 is twenty-six feet per minute, the fabric emerges from between the belts of unit 12 at eighteen inches in width and is again laterally compacted to seventeen and three-fourths inches and moved between the straight runs of the belts of unit 13 moving at a rate of twenty-four feet per minute. I have found it desirable to move the take-up means at twenty-five feet per minute in which case final width of the fabric will be seventeen and three-fourths inches in width.

In this manner, fabrics having a five percent increase in lateral compaction and a four percent increase in lateral resiliency can be obtained. Longitudinal compaction and resiliency figures as set forth above may also be obtained.

When less than full compensation is to be achieved, the form of a succeeding unit may be widened as in the case of the forms 40a, 40b, and 40c, but to a lesser extent, depending on the amount of lateral compaction achieved. When an augmented lateral compaction is being carried out, the form of a succeeding unit may be narrowed to any suitable extent provided that pleating does not occur.

A highly desirable result of the repeated steps of compacting the fabric, setting it in a compacted condition, and naturally relaxing the fabric, as by the present process and apparatus, and especially where there are both longitudinal and lateral compactions as well as full relaxations of the fabric, is that there is imparted to the fabric a high degree of resiliency both widthwise and lengthwise. Since the loops of the fabric tend to return to the position in which they were set, and since the present process and apparatus sets the strands of the fabric in particularly closely-spaced condition—but one that is achieved with intermediate relaxations of the fabric in a natural manner—the stretch characteristics of a garment made from the fabric can be controlled in a particularly effective and desirable manner.

When desired, there may be used forms which do not extend between the belts, tho, of course, in such instances, a gap dielectric system cannot be tuned to a metallic form (tho it may be tuned to water). One such form, as shown in FIGS. 25 and 26, is unitary and comprises a thick portion 220 corresponding generally to the portion 41, and a portion 221 of decreasing thickness and increasing width and corresponding generally to the portion 42. In instances wherein the forward pull on the fabric is insufficient to pull the form forward against the turns of the belts, as may be the case when the drag of the fabric is minimized as herein exemplified, there may be provided, at each outer rearward part of the portion 220, a rotary member 222 set in a transversely central recess 224 therein and rotating on an axle 225, and having its circumference in line with the edge 226 of the portion 220. Each such edge is cut away at its rearward part as shown at 227 so as to expose both the side and the rear of the circumference of the rotary member 225. Pressed against the rotary members 225 as by springs 229 are rotary members 230 between which and the members 225 the fabric is adapted to pass smoothly. The rotary members are slidably mounted on diagonal supports 231 so that they will not only maintain a form centered, but will also press it forwardly against the turns of the belts.

In certain instances, a lateral compaction of the fabric may be achieved by means of belt speeds such that the speed imparted to the fabric by the turns of the belts of a succeeding unit is sufficiently greater than the speed of the straight runs of the belts of a preceding unit so that there is imparted to the fabric (which extends thru the opening 101) a slight longitudinal stretching action (as indicated in FIG. 27 wherein the trough 104 of FIG. 5B is replaced by an additional roll 105) which, however, is less than the longitudinal compacting action of the preceding unit. The portions 42 and 46 or the portion 221 of the form of the succeeding unit should be slightly narrower (less wide) than in the case of the forms hereinbefore exemplified in connection with units 11, 12, and 13 as the case may be, in order to permit such lateral compaction of the fabric.

While any of a variety of air-gap di-electric means may be employed for heating a form such as the form 40, there is shown in FIG. 28 one type of circuit whereby such heating may be effected. As will be seen, this circuit comprises a main conductor 240 which extends to a choke 242 and from which a lead 244 extends to a grounded condenser 245, and a lead 246 extends to a resistance 247 whence a lead 248 extends into a metering device 249 as shown. A lead 250 extends from the lead 248 to a grounded resistance 251. From the choke 242 a lead 252 extends to a condenser 253 from which a lead 254 extends to a condenser 255, whence a lead 256, to which the electrode means 80 are connected, extends to a condenser 257. The lead 256 extends to a condenser 257 from which a lead 258 extends to an RF voltmeter unit 259. From the lead 252 a lead 260 extends to the plate 261 of an oscillator tube 262, the filament 263 of which is connected to a tank coil 264 which is connected by a lead 266 to the lead 254 and from which a lead 267 extends to a variable condenser 268 connected to the lead 254 by a lead 269. From the grid of the tube 262 a lead 270 extends to a parasitic suppresser 272 from which a lead 274 extends. A grounded conductor 276 extends to a condenser 277 from the same end of the tank coil from which the lead 267 extends, and a conductor 278 connects lead 274 and condenser 277. The lead 274 extends to interconnected ground bias resistance 284 from which a grounded lead 285 extends to a resistance 286 whence a lead 288 extends to a plate overload device 290 from which a main conductor 292 extends. Leads 294 from the lead 282 and 295 from the lead 288 extend to variable resistances which are connected into the metering device as shown. Leads 296 and 297 bridged by a filtering condenser 298 extend to an oscillator filament transformer.

Since certain changes in carrying out the above process and in the construction set forth which embody the invention, may be made without departing from its scope, it is intended that all matter contained in the above description or shown in the accompanying drawings shall be interpreted as illustrative and not in a limiting sense.

I claim:

1. A form for conducting tubular fabric in a shape having spaced sides toward, and engaging the spaced sides thereof with, converging portions of means tending to bring said sides toward each other as the fabric is moved forwardly, and comprising a multiplicity of aligned forwardly-extending sections and means to limit forward and rearward movement of said sections relative to each other while permitting a limited forward and rearward movement of said sections relative to each other to permit said sections to adjust themselves to variations in the contour of said converging portions and in the fabric.

2. A form as in claim 1 wherein said means also permits a limited relative movement of said sections vertically with respect to a horizontal fabric.

3. A form as in claim 1, two of said sections being outer sections and other of said sections being intermediate said outer sections, and certain of said sections having a greater width in at least part thereof than other of said sections.

4. A form as in claim 3 wherein said certain of said sections comprise said outer sections.

5. A form as in claim 3 wherein said certain of said sections comprise at least certain of said sections intermediate the outer sections of said form.

6. A form for conducting tubular fabric in a shape having spaced sides toward, and engaging the spaced sides thereof with the turns of, driving means between which the fabric is to be moved longitudinally forwardly, and comprising laterally disposed aligned sections comprising outer and intermediate sections, and means to restrict lateral movement of said sections while permitting limited longitudinal movement thereof to permit each section to adjust itself to variations in the contour of the driving means as they make said turns and in the fabric.

7. A form for conducting tubular fabric thereover in a forward direction comprising a multiplicity of aligned sections having generally parallel contiguous edge portions, outer sections of said form having edge portions diverging in a forward direction, and means to limit forward and rearward movement of said sections relative to each other while permitting a limited forward and rearward relative movement thereof.

References Cited by the Examiner

UNITED STATES PATENTS

| 1,640,491 | 8/27 | Dykes | 26—55 |
| 2,415,185 | 2/47 | Moon | 26—55 |
| 2,597,528 | 5/52 | Redman | 26—55 |
| 3,007,223 | 11/61 | Wehrmann | 26—56 X |

FOREIGN PATENTS

| 1,181,847 | 1/59 | France. |
| 394,933 | 7/33 | Great Britain. |

DONALD W. PARKER, *Primary Examiner.*

MERVIN STEIN, *Examiner.*